United States Patent Office 2,778,280
Patented Jan. 22, 1957

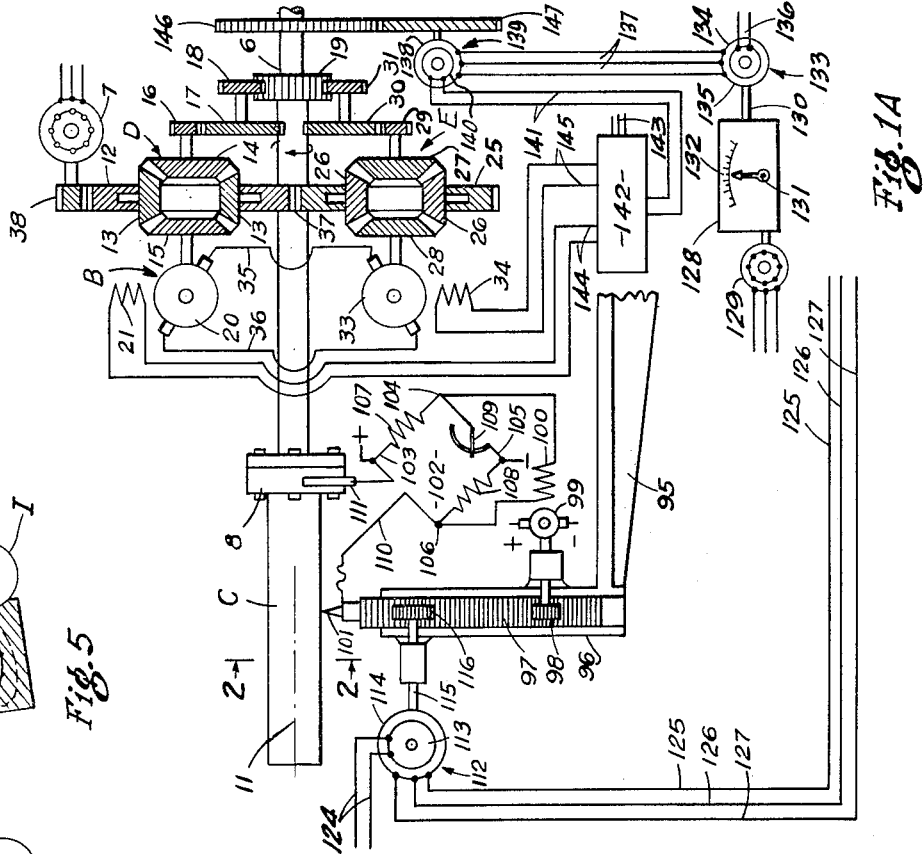

2,778,280

PATTERN CONTROLLED MACHINE TOOL

Lev A. Trofimov, Willoughby, Ohio, assignor to Fairchild Engine and Airplane Corporation, a corporation of Maryland Application August 28, 1953, Serial No. 377,051

6 Claims. (Cl. 90—13.5)

This invention relates to machines for forming rotating work pieces by a cutting tool, and that are therefore generally of the lathe class.

One type of such machines comprises means for mounting and power-rotating a work-piece-blank around a rotational axis, and for feeding a tool toward and from the axis while concurrently traversing the tool in the axial direction; thus forming a three dimensional article.

Another type of machine omits the traversing movement, and forms a profile on a two dimensional blank, for example on a planar sheet metal blank.

The present invention is applicable to machines for forming either two dimensional or three dimensional work pieces.

There is a class of such machines that are automatically controlled to form a rotating work piece into correspondence with a template, model, or the like, that may be referred to generically as a "pattern piece."

The present invention is particularly applicable to machines of this automatic class, although as will become apparent hereinafter, and as exemplified in the appended claims wherein the actual invention is set forth, the invention is applicable to other kinds of machines in the various arts.

In the case of automatic "pattern piece" controlled machines, the formed surface on the work piece must in many instances, be completely free of all deviations from the form prescribed by the pattern piece, and if any such deviations are left by the tool, they must be removed by time consuming and costly expert hand finishing.

It is desirable to feed the tool of such machines toward and from the work axis by motor power, transmitted to the tool through a feed mechanism, and it is always necessary to provide speed reduction in the mechanism between the motor and the tool; and this has heretofore been done by a speed reduction gear transmission. But such transmissions unavoidably have "back-lash" lost motion at the meshed teeth of the gears; the greater the number of gears, the greater the cumulative back-lash and lost motion.

The tool in most cases performs its forming operation both while being fed inwardly toward the work axis and also while being fed outwardly away from it; and when the feed mechanism, including the reduction gearing, has fed the tool to the limit of its inward motion, and reverses for its outward motion, all of the backlash of the transmission gears must first be taken up by the reversal before the outward movement of the tool can begin. There is thus a back-lash time period during which the tool is fed neither in nor out.

Particularly in the case of a three dimensional work piece, and assuming that it is being rotated, the axial traverse movement of the tool must go on continuously, and uniformly and not started and stopped, otherwise it itself would cause deviations in the formed surface as aforesaid and as will be understood; and uniform traversing movement can readily be accomplished by a feed screw driven by motor power as in common machine tool practice.

But as noted above, when the tool feed, both in and out, ceases at the time of reversal, and the traverse movement is going on then when the tool feed starts again it is at a point farther along axially on the work piece than when the feed stopped, and this makes a serious deviation in the formed surface, usually in the form of a groove or a ridge around the work.

It is one of the primary objects of the present invention to provide for a machine of the class referred to, a reversing feed mechanism for the tool, driven by power through a transmission, and having as great a speed reduction in the transmission as may be wanted, without limit, and in which all back-lash is eliminated upon reversal of the tool feed; thus obviating the fault of prior speed reduction reversing feeds, referred to above.

Another object is to provide a reversing feed mechanism in which back-lash is eliminated as described in the preceding object, notwithstanding that the transmission may comprise speed reduction gearing with the known advantages thereof.

Further, in some cases, although the blank is rotated about a rotational axis, the form to be given to the work pieces is not circular in cross section, but is oblong; and a blank is accordingly chosen that is oblong in cross section to reduce the amount of material that must be removed by the tool; and the blank may therefore be said to have edges at the ends of its major cross sectional axis.

Such a blank may be mounted on a rotary spindle, and the spindle may be driven by rotary power; and again speed reduction between the source of rotary power and the spindle must be provided in a transmission; and again such transmissions have heretofore comprised speed reduction gears, with meshed teeth and consequent back-lash.

When the tool is a cutting tool, as is usual in such cases and a considerable amount of material must be removed from the blank, the tool exerts pressure upon the blank at the point of cutting.

As the blank rotates, the point of cutting approaches an aforesaid edge thereof at one side of the edge, and the tool, by its pressure, exerts torque on the work piece in the direction to oppose its rotation.

When continued rotation of the blank causes the point of cutting to pass over the said edge and onto the other side thereof, then the pressure of the tool on the blank is in the reverse direction, that is, the tool pressure exerts torque on the blank in the direction to assist its rotation.

Because of the backlash in the transmission gearing, this reverse torque on the blank momentarily rotates the blank and spindle forwardly freely and independently of the transmission until the back-lash or lost motion in the gears driving the spindle is all taken up.

The blank thus moves ahead through a rotational angle determined in extent by the total amount of back-lash.

When the blank subsequently rotates until the tool torque again opposes its rotation, the blank momentarily stops until the back-lash is all taken up again in the other direction.

Thus because of back-lash in the transmission rotatably driving a blank having two edges, and during one complete revolution of the blank, the tool pressure causes the work piece to move ahead twice, and momentarily stop twice.

The tool is being continuously fed against the blank and this irregularity of rotation of the blank causes periodic deviations from the contour or form prescribed by the pattern piece.

It is therefore another primary object of the present invention to provide, for a machine of the class referred to, a rotary power drive for the work blank, driving through a transmission having as great a speed reduction in the transmission as may be wanted, without limit, and in which all back-lash is eliminated; thus obviating the fault of prior speed reduction feed drives referred to above.

Another object is to provide a rotary power drive and transmission for work blanks in which back-lash is eliminated as described in the preceding object notwithstanding that the transmission may comprise speed reduction gearing with the known advantages thereof.

Another object is to provide, generally, a rotary power drive for a load, comprising speed reduction gearing having back-lash therein, and comprising means to eliminate all lost motion that might otherwise result from the back-lash, when the direction of the drive is reversed the load; or when the load overhauls the drive.

Other objects are:

To provide generally an improved apparatus for forming a work piece from a rotary blank to a form corresponding to a pattern piece;

To provide improved means for rotatably driving a work piece blank and a pattern piece in unison.

To provide improved means for feeding a tool into and out of a rotary work piece blank to form a work piece of different radii from its rotary axis;

To provide improved means for forming a workpiece from a driven rotary blank, corresponding in cross sectional contours to a rotary pattern piece rotatably driven in unison with the blank, by feeding a forming tool into and out of the blank in correspondence with movements of a stylus contacting the pattern piece.

Other objects will become apparent hereinafter to those skilled in the art.

In view of the foregoing objects, and others which will occur to those skilled in the art to which the invention appertains, as the following description of an embodiment of the invention proceeds, the invention may be embodied in various constructions of apparatus, for driving various kinds of loads in the various arts; as referred to herebefore. However, as mentioned hereinbefore, the invention has particular application to machines of the automatic machine tool class; and for purposes of illustration and description of at least one embodiment as required by law, the invention is described hereinafter as applied to a machine of the automatic lathe class for shaping work blanks into work pieces corresponding in form to that of a pattern piece; and in this particular, chosen embodiment comprises generally the following.

The blank is rotated by motor power through a back-lash free transmission, as referred to above; and the pattern piece is concurrently rotated at the same speed, and in unison with the blank.

A power driven rotary cutting tool is fed toward and from the blank rotational axis by motor power, through a reversible back-lash-free transmission, as referred to above, and the tool cuts during both directions of feed; and is continuously traversed axially of the blank by motor power.

The tool feeding and reversing transmission is controlled by an electric system, by which changes in the rate of tool feed, and reversals thereof, are caused to occur; and the electric system controlling the transmission is actuated by a circuit connecting a pair of selsyn units.

A stylus is provided having an end point in electric conducting relation with the pattern piece, and is traversed thereover axially in unison with axial traversal of the tool. Any momentary change in conductivity at the stylus end point due to rotation of the pattern piece actuates the circuit of an electric motor to propel the stylus inwardly toward the rotational axis of the pattern piece or outwardly away from it, whereby the end point of the stylus is maintained in substantially constant-conductivity contact with the pattern piece.

One of the selsyn units, acting as a transmitter, is rotated to different angular positions in correspondence with the inward and outward movements of the stylus. The other selsyn unit, acting as a receiver, is rotated to different angular positions in correspondence with the inward and outward movement of the tool.

Any difference between the angular positions of the selsyn units causes voltage in the circuit connecting them then to actuate the electric system, which controls the tool feed, to cause the tool to be moved in or out and to follow the in and out movements of the stylus; and to bring the two selsyn units into positions of minimum angular difference, and stop tool feed, when in or out movement of the stylus ceases.

The embodiment to be described therefore comprises among other things means by which a tool is fed into and out of a rotating blank and concurrently fed axially thereover, to form a work piece as prescribed by the form of a pattern piece, without deviations from the prescribed form being caused by irregularities or momentary interruptions of the tool feed or rotation of the blank, in spite of the fact that the rotational power and the tool feed power are transmitted through reduction gearing with attendant back-lash lost motion; and comprises improved means for controlling the direction and rate of the tool feed toward and from the blank axis in correspondence with the direction and rate of movement of a stylus following the form of the pattern piece.

It is preferable to utilize a rotary tool such as a circular abrasive tool, or a circular milling cutter tool.

In such case, while in general the pattern piece is formed to have a cross sectional contour the same as that wanted in the finished work piece, this will in many cases not be literally true, because the contour of the rotating pattern piece is contacted by a point on the stylus whereas the contour of the work piece is formed by the circular periphery of the tool; and it will therefore be apparent to those skilled in the art that the pattern piece will be modified when preformed to take into account the diameter of the cutting tool. The pattern piece would be literally exactly the same as the wanted work piece if the cutting tool were one that cut the work piece at a point on the tool corresponding to the stylus point.

The invention, in a chosen embodiment thereof is disclosed in the following description taken in connection with the accompanying drawing in which:

Figs. 1 and 1A together constitute a diagrammatic view of an embodiment of the invention;

Fig. 2 is a cross sectional view from the plane 2—2 of Fig. 1A;

Fig. 3 is a cross sectional view from the plane 3—3 of Fig. 1;

Figs. 4 and 5 are views similar to Fig. 3 with a work piece thereof in different rotated positions.

Figure 1:
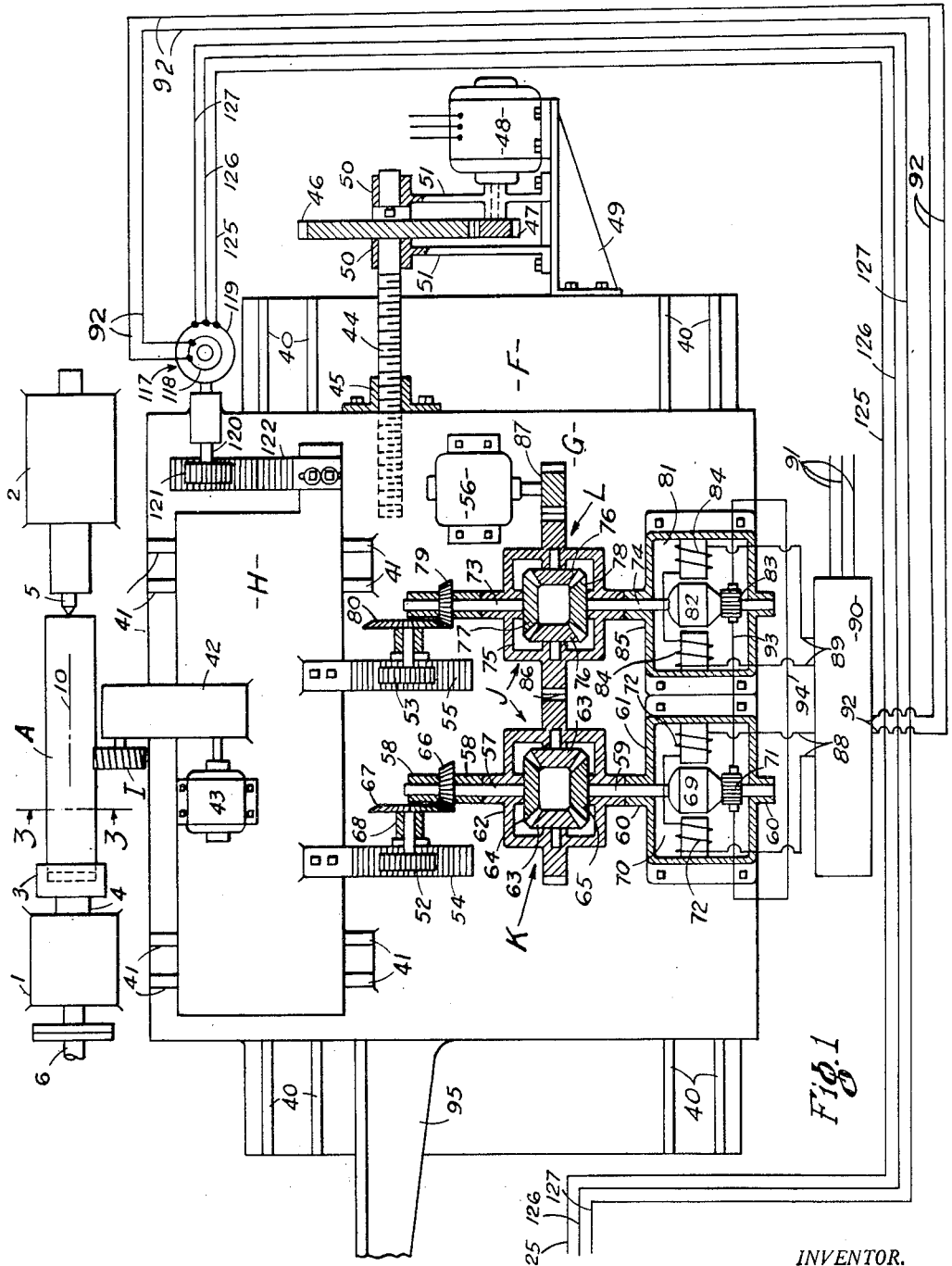

Referring to the drawing there is shown at 1 and 2 a head stock and tail stock of a machine generally of the lathe type.

At A is an elongated work-piece-blank, held at one end in a chuck 3 on a rotary head stock spindle 4; and at the other end mounted on a center 5 in the tail stock.

The spindle 4, beyond the head stock 1, is coupled to a shaft 6, by which it is driven by a motor 7 through a transmission B to be described.

The shaft 6 extends beyond the transmission and has coupled thereto, as at 8, one end of an elongated "pattern piece" C as referred to hereinbefore, the coupling comprising a cylindrical flange on the pattern piece to serve as an electric collecting ring to be described.

As referred to, the blank A is to be cut to a form prescribed by the pattern piece C.

An unlimited variety of pattern pieces may be utilized. The pattern piece C is shown in cross section in Fig. 2, and is chosen as one in connection with which all features of the invention may be developed, and as seen it is oblong in section and has concavo-convex side faces and rounded edge surfaces.

A blank A is accordingly chosen that is oblong in section, as shown in Figs. 3, 4 and 5 wherein the form of the work piece C to be cut therefrom is indicated in dotted lines.

The rotational axis 10 of the blank is indicated at 10 in Figs. 1 and 3 and the rotational axis of the pattern piece C, coaxial therewith, is indicated at 11, Fig. 1A and 2.

The transmission B is shown diagrammatically, bearings for rotary parts, supports for the bearings, etc. being omitted for simplicity of illustration; and comprises the following parts.

The transmission B comprises two differential gearing parts D and E. The gearing part D comprising a spider element 12, rotatably supporting pinions 13—13, meshed with differential gears 14 and 15.

The differential gear 14 is connected to a pinion 16 meshed with a gear 17, connected to a pinion 18, meshed with a gear 19 on the shaft 6.

The differential gear 15 is connected to an electrodynamic unit 20, built like an electric generator and which may operate as a generator or as a motor.

The unit 20 has a field winding 21 energized in a manner to be described.

The differential gearing E is preferably the same as the gearing D, comprising a spider 25, pinions 26—26, differential gears 27—28, the differential gear 27 being connected through intermeshed gears 29, 30 and 31 to the gear 19.

The differential gear 28 is connected to another electrodynamic unit 33, preferably like the unit 20, having a field winding 34 energized in a manner to be described.

A closed loop circuit comprising wires 35—36 connects the armatures of the electrodynamic units 20—33 in series.

The spiders 12 and 25 are of gear form meshed together at 37. The motor 7 is a substantially constant speed motor, an induction motor being shown, and it runs continuously at full speed, and drives a pinion 38 meshed with the spider 12 and therefore drives both spiders 12 and 25 in opposite directions continuously at a constant speed.

The field windings are designated as 21 and 34 but for convenience the magnetic fields produced thereby may be referred to by these same reference characters.

The means for energizing the fields 21—33 to be described may vary them to be equal or unequal.

When they are equal, the shaft 6, resisting rotation, holds the differential gears 14 and 27 at rest, and the differential gears 15 and 28 are driven by the spiders at full speed, twice that of the spiders, and they drive the units 20—33 in opposite directions at twice the speed of the spiders, and the units, acting as generators impress equal potentials on the closed circuit 35—36 and no current flows therein and the generators run freely and no output torque is developed on the shaft 6.

If the field 21 is stronger than the field 34, the potential of unit 20 will predominate over that of unit 33; load current will flow in the closed circuit 35—36; the electrical load will require input torque to drive the unit 20, now acting as a generator and will cause it to exert braking action on the differential gear 15; and the current in the load circuit 35—36 will drive the unit 33 as a motor causing it to develop output torque and apply it on the differential gear 28 to drive it.

The generator 20 thus slows down due to the aforesaid generator load. This slows down differential gear 15, and the spider pinions 13—13 reacting thereon, rotate the differential gear 14 in the direction of spider 12. The torque of spider 12 always divides equally between differential gears 14 and 15. The output torque at differential gear 15 at reduced speed to drive the generator 20, appears on differential gear 14 at considerable speed, and acting through speed reduction gears 16—17—18 applies this torque, magnified by the speed reduction, to the shaft 6, to drive it, say in the counterclockwise direction as viewed from the left end in Fig. 1A.

The unit 33 now driven as a motor, rotates in the same direction as before, but at increased speed, and faster than the generator 20. It would tend to rotate faster because it is a motor with weakened field; but also it is constrained to rotate faster, and its faster speed is predetermined for it by the slower speed of the generator 20, because in a double differential gearing as here illustrated (with differential gears 14 and 27 both ultimately connected to a common gear 19), the sum of the speeds of differential gears 15 and 28 is always a constant, and since gear 15 is going slower, gear 28 goes faster.

The motor torque of unit 33, applied to gear 28 at increased speed, reacts through pinions 26—26 and rotates differential gear 27 in the direction opposite to that of spider 25 and in the same direction as differential gear 14, and applies the motor torque (amplified by the speed reduction gears 29, 30, 31) to the gear 19 in the direction to drive the shaft 6 in the counterclockwise direction.

Thus torque derived from the generator 20 and torque of the motor 33 are both applied in the same direction to the shaft 6, through meshed speed reduction gears and the actual speed of shaft 6 will be determined by the difference between the strength of the fields 21 and 34.

The means for energizing the fields 21 and 34 is as follows; and as will be seen, the field 21 is energized stronger than the field 34, which in view of the foregoing causes the shaft 6 to rotate in the counterclockwise direction; and the shaft 6 rotates at constant speed.

At 138 is a constant speed reference unit, shown diagrammatically, and which may be of well known construction, comprising a transmission to which rotary power is supplied by a constant speed motor 129. The transmission has an output shaft 130 driven at constant speed. The mechanism is adjustable manually by rotating a shaft 131 to different positions, indicated on a scale 132 to adjust and fix the constant speed of the output shaft 130.

At 133 is a selsyn unit having a three phase stator 134; and a single phase rotor 135 connected to be driven at constant speed by the shaft 130. The rotor 135 is energized by single phase A. C. from mains 136. The stator 134 is connected by three-phase lines 137 to the three phase stator 138 of another selsyn unit 139 having a single phase rotor 140 connected to single phase signal lines 141.

At 142 is diagrammatically represented a device sometimes known as a rectifying amplifier and of well known construction, comprising electronic tubes and a network system energized by three phase A. C. mains 143, and controlled by A. C. signal current in the lines 141, and having D. C. output circuit lines 144 connected to energize the field 21 and output lines 145 to energize the field 34.

If current in the signal lines 141 is of zero value, the amplifier operates to deliver equal D. C. currents in the field lines 144 and 145. If there is current in the signal lines 141 above zero value and in one phase condition, which may be referred to here as positive, the output current in field lines 144 will be greater than that in field lines 145, and if the signal current is above zero in the opposite phase condition which may be referred to here as negative, the output field current in field lines 145 will be greater than that in field lines 144.

The selsyn rotor 140 is connected to the work driving output shaft 6 by gears 146 and 147 on the respective shafts.

Upon supplying power to the speed reference device 128 by motor 129, the selsyn rotor 135 is driven at constant speed, and causes the selsyn stator 138 to be energized by the three phase lines 137 and this causes the selsyn rotor 140 to give positive signal current to the device 142 and the latter delivers current to the field lines 144, stronger than that to the field lines 145 and the field 21 then being stronger than the field 34, the transmission B begins to drive and accelerate the shaft 6 as described.

The shaft 6, through gears 146—147 drives the selsyn rotor 140 in the same direction as the selsyn rotor 135 is driven.

As the shaft 6 accelerates the selsyn rotor 140, the speed of selsyn rotor 140 approaches that of selsyn rotor 135 at which speed the signal current from rotor 140 would become zero and the two fields would become equal and the shaft 6 would stop; but since this would restore initial conditions at which the shaft 6 started to accelerate it cannot occur; so that in operation the shaft 6 comes up to a certain speed at which the selsyn rotor 140 lags behind the selsyn rotor 135 by a definite amount; and the selsyn rotor 135 being at constant speed, the shaft 6 runs at constant speed; this speed of shaft 6 being determined by adjustment of the output speed of the speed reference unit 128.

If for any reason driven load on the shaft 6 should tend to slow it down, the selsyn rotor 140 would tend to slow down and it would signal the device 142 to deliver a greater preponderance of current to the field 21 and this would give more torque to the shaft 6 and restore its speed to the constant value.

The shaft 6 drives the work blank A. The tool I, Fig. 1, is fed into and out of the work blank A by means to be described, and normally opposes rotation of the blank and puts load on the shaft 6. There are times, as referred to hereinbefore, when the feed and pressure of the tool overhauls the blank A and shaft 6, and rotates the shaft 6 momentarily faster than it is being power-driven; and this introduces the back-lash and lost motion of the speed reduction gears 16 to 19 and 29 to 19 and this would mutilate the work piece as referred to, were it not for countervailing action in the transmission B.

This countervailing action will be described later.

The means for applying motor power to feed a rotary tool forwardly and reversely will now be described.

In Fig. 1 at F is shown a lower or main stationary base.

At G is an intermediate base supported on the base F and guided for side to side horizontal movement (as viewed in Fig. 1) by ways 40—40 on the base F.

At H is an upper base supported on the intermediate base G and guided for forward and rearward reciprocatory movement (toward the top and bottom of Fig. 1 as viewed) by ways 41—41 on the intermediate base G.

Upon the upper base H is mounted, to move therewith, a transmission housing 42 containing a transmission, not shown, but supplied with power by a motor 43 and rotably driving a tool I, which may be an abrasive wheel or any kind of rotary tool, but is preferably a milling cutter.

The intermediate base G is propelled to give traversing movement of the tool I by a screw 44, meshed with a travelling nut 45 secured to the base G, and rotated at low speed by a gear 46 thereon meshed with a pinion 47 connected to a motor 48, which is supported by a bracket 49 mounted on the main base F.

Any amount of speed reduction may be provided between the motor and the screw, the drawing showing speed reduction by only two gears 46 and 47 for simplification. The screw 44 is anchored against shifting axially by bearing elements 50—50 therefor at each side of the gear 46 constituting part of a transmission housing 51 mounted on the bracket 49.

The motor 48 is of the reversible type by which the base G may be moved to a starting position at one end of the ways 40—40 and, upon reversing the motor, toward the other end; the reversing means for the motor being well known and not shown.

The base H is reciprocated to feed the tool I toward and from the axis of the blank A by rack pinions 52—53 engaged respectively with racks 54—55 extending from the base H; power to the pinions 52—53 being supplied by a continuously running motor 56 mounted on the base G, and transmitting through a transmission indicated generally at J on the base G, and comprising two parts K and L.

The transmission parts K and L are in general like the transmission parts D and E above described, and are shown somewhat diagrammatically but are shown with bearing supports on the base G for rotary parts, by which it is made apparent that the entire transmission may move with the base G.

The transmission part K comprises a shaft 57, rotatably supported in bearings 58—58 on the base G; and a coaxial shaft 59 rotatable on bearings 60—60 of a housing 61 on the base G.

A differential gearing spider element 62 is rotatably on the shafts 57—59 and rotatably supports pinions 63—63, meshed with differential gears 64—65.

The differential gear 64 is connected to the shaft 57, on which is mounted a bevel gear 66 meshed with a bevel gear 67, the latter rotatably supported on bearings 68 on the base G and driving the rack pinion 52.

The differential gear 65 is connected to the shaft 59 on which is mounted the rotor 69 of a unit 70, the rotor having a commutator 71 and rotating between field poles having shunt field windings 72—72 thereon in series, and supported on the housing 61; the unit 70 thus having the construction of an electric generator or motor, and operable as either.

The transmission part L is similar to the part K, comprising aligned shafts 73—74; a spider element 75 rotatably supporting pinions 76—76; differential gears 77—78, connected respectively to the shafts 73 and 74; bevel gears 79—80 driving a rack pinion 53; a unit 81 comprising a rotor 82 and commutator 83 driven by the shaft 74, and having field windings 84—84 connected in series and mounted in a housing 85.

The housings 61 and 85 are mounted on the base G.

The spider elements 62—75 have peripheral gear teeth meshed together at 86, and the spider element 75 is driven by the motor 56 through a pinion 87 meshed with the spider 75, whereby both spider elements are driven at the same speed, in opposite directions.

The field windings 72—72 and 84—84 are energized with direct or rectified alternating current by two circuits 88—89, constituting D. C. output circuits of a device 90 of well known type and construction, like or similar to the above described rectifying amplifier 142. It is energized from three phase alternating current mains 91, and delivers rectified D. C. output to the circuits 88—89 under control of a single phase alternating current control circuit 92. As explained for the rectifying amplifier 142, the alternating current in circuit 92, may be at zero value; and may rise above zero at one phase condition which in effect makes it of positive polarity; and may rise above zero, at an opposite phase condition which in effect makes it of negative polarity. At a zero value of the A. C. control current in circuit 92, the D. C. output currents in circuits 88—89 are equal; and as the current in control circuit 92 rises to positive values above zero value, the current in output circuit 88 rises proportionally and becomes greater than that in circuit 89, and vice versa, when the current in the control circuit rises to negative values above zero.

The source of the alternating current in control circuit 92 will be described later.

The commutators 71—83 of the units 70—81 are connected in a closed loop circuit by wires 93—94 connecting their brushes.

In the operation of the transmission J, and assuming first that the control current in circuit 92 is at zero value, the two field windings 72—72 and 84—84 will be energized equally.

The spider 62 of transmission part K, driven in one direction say clockwise (as viewed from the lower side of the figure) and acting through the pinions 63—63, applies equal torques to the differential gears 64—65, tending to rotate the shafts 57 and 59 clockwise.

The spider 75, of transmission part L, driven in the opposite direction similarly tends to rotate the shafts 73—74 counterclockwise, by equal torques on the differential gears 77—78.

Clockwise torque on the shaft 57, acting through gears 66—67, tends to rotate the rack pinion 52 in the direction to propel the rack and base H downwardly (as viewed).

Counterclockwise torque on the shaft 73 acting on pinion 53 through gears 79—80 tends to move the rack 55 and base H upwardly.

These two rack propulsion forces are opposite and the transmission parts K and L being preferably alike, the opposite forces are equal, and the base H remains at rest, and the differential gears 64 and 77 are held at rest.

Torque on differential gear 65 rotates the shaft 59 and rotor 69 clockwise; and torque on differential gear 78 rotates shaft 74 and rotor 82 counterclockwise; and the rotors are free to rotate; and the differential gears 64 and 77 being held at rest, differential gears 65 and 78 are driven and drive the rotors 69 and 82 at twice the speed of the spider elements.

The field windings 72—84 being equally energized and the fields and rotors being preferably alike; the units 70 and 81 act as generators and impress equal and opposite potentials on the closed circuit 93—94 and no load current flows therein.

If now control current in the circuit 92 should rise to positive values, then in a manner that will be described one of the sets of field windings, say the windings 72—72, will be energized more strongly than the other windings, 84—84. The generated potential of the unit 70 will then preponderate over that of the unit 81, and load current will flow in the closed circuit 93—94.

This current load on the rotor 69, acts as a brake thereon and slows it down. Torque to drive it comes from the differential gear 65, and it slows down, and (as characteristic of differential gearing) differential gear 64 speeds up, and the same torque that is developed on differential gear 65 at low speed, appears on differential gear 64 at higher speed, and, as described, is applied to rack 54 in the direction to propel it downwardly.

The generated current in the closed load circuit 93—94 drives the rotor 82, and the unit 81 as a whole acts as a motor, rotating in the same direction as before but at higher speed, and applies its motor torque to the differential gear 78, tending to make it go faster than before.

The speed of spider element 75 being fixed, this tends to make the differential gear 77 reverse, and the motor torque on gear 78 appears on gear 77 in the reverse direction, and is transmitted through shaft 73 and gears 79—80 to rack pinion 53 in the reversed direction. Pinion 53, now propels the rack 55 and base H downwardly, the same as pinion 52, each assisting the other.

This movement of the base H moves the tool I with feeding movement away from the work blank axis 10.

If the current in control circuit 92 should have negative values the field windings 84—84 will be energized more strongly than the windings 72—72 and by a mode of operation similar to that described above, the unit 81 will be the generator and the unit 70 will become the motor and both pinions 52 and 53 will be driven in the direction to propel the racks 54 and 55 and base H upwardly (as viewed) and the tool I will be fed toward the work axis.

The greater the positive or negative value of A. C. in the control circuit 92, the more will one field winding 72 or 84 predominate over the other due to the characteristics of the device 90; and in consequence, the faster will the base H be propelled to feed the tool I inwardly or outwardly, as will be understood.

In view of the premises, it is obviously desired to have the tool I fed into, or out of, the work, or, stop feeding, in accordance with the contours of the pattern piece C; and in view of the foregoing, the current in the control circuit 92 must rise to positive values or to negative values or come to zero, in accordance with the contours of the pattern piece; and this now will be explained.

A bracket 95 extends from the intermediate base G, and supports a guideway 96 Fig. 1A in which a rack 97 is reciprocable by a rack pinion 98, driven by a reversible motor 99, diagrammatically shown but mounted on the bracket 95, the armature of the motor being always energized with D. C. as indicated and having a field winding 100, reversibly energized for forward drive or reverse drive, or for stopping of the motor.

A stylus 101 is mounted on one end of the rack and the guideway 96 is positioned so that the rack and stylus movement is substantially at right angles to the axis of the pattern piece C; and so that the stylus may engage the periphery of the pattern piece as it rotates; and so that the stylus will be traversed over the axial length of the pattern piece upon traversing movement of the intermediate base G.

A rectangular bridge loop 102 is provided having corner points 103 to 106 proceeding in one direction around the loop. Resistors 107 and 108 are between the points 103 and 104 and between the points 105—106 respectively, and an adjustable resistor 109 is between the points 104—105. Between the points 106 and 103 is a circuit comprising a flexible wire 110 connected to the stylus 101, and a collector brush 111 contacting the rotary flange 8 of the pattern piece.

The field 100 of the motor is connected across the points 104—106. A D. C. supply is connected across the points 103—105.

During rotation of the pattern piece C, the periphery thereof will tend to press upon or withdraw from the stylus point and thereby increase or decrease the conductivity of the stylus point, and thereby change the resistance of the loop leg between points 106—103.

In the manner well known for the bridge loop 102 as described, and after a suitable fixed adjustment of the rheostat 109, and after establishing suitable polarity at the motor field winding 100, the occurrence of increased conductivity at the stylus point will cause the motor 99 to rotate the pinions 98 and propel the rack 97 in the direction to reduce the conductivity, and vice versa upon occurrence of decreased conductivity; so that the stylus is always held by the motor 99 at a position of predetermined conductivity.

In practice, a microscopic arc is formed and maintained between the stylus 101 and the pattern piece C, too small to burn the pattern piece but long enough to prevent frictional wear on the stylus point or on the pattern piece; with the result that the stylus 101 and rack 97, reciprocate inwardly and outwardly in accordance with the contours of the pattern piece; while being moved traversely thereover from end to end upon traversal of the base G by the aforesaid screw 44.

A selsyn unit 112, Fig. 1A comprising a single phase rotor 113 and three phase stator 114 is provided supported on the guideway 96; and the rotor 113 is connected by a shaft 115 to a rack pinion 116 meshed with the rack 97.

A selsyn unit 117 is provided, Fig. 1, comprising a single phase rotor 118 and a three phase stator 119, supported on the base G; and the rotor 118 is connected by a shaft 120 to a rack pinion 121, meshed with a rack 122 mounted on the base H to move therewith, and extending rectilinearly in the direction parallel to the guideways 41—41 of the base H.

The rotor 113 of selsyn unit 112 is energized with single phase A. C. from mains 124. The stators of the two selsyn units 112 and 117 are connected by lines 125—126—127. The rotor 118 of selsyn unit 117, is connected to the said control circuit 92.

With this arrangement of the selsyn rotor 113 is angularly or rotatively displaced in one direction, with respect to the selsyn rotor 118, current in the lines 125, 126, 127, will produce control current in the control circuit 92, say in the positive sense, and if displaced in the opposite direction will produce control current of the opposite or negative sense; and in both instances the amount of control current in the circuit 92 will be commensurable with the angle of displacement.

When both rotors 113 and 118 are in the same relative angular positions, the current in the control circuit 92 will be at zero value.

The rotor 113 of the selsyn unit 112, will be angularly displaced, clockwise or counterclockwise with respect to the rotor 118 of the selsyn unit 117, or, brought into the same relative angular position therewith, by the aforesaid movements of the stylus 101 and rack 97; and positive or negative current, or zero current, will be communicated to the control circuit 92 of the device 90.

As described, the device 90 responds in a known manner, to said variations of current in the control circuit 92; and delivers D. C. to the two field circuits 88—89; the current in the field circuits being equal when the current in the control circuit 92 is at zero, and the current in one field circuit being greater than that in the other, when the current in the control circuit 92 has one polarity, and vice versa when it has the other polarity.

As described for Fig. 1, when the field circuits 88—89 are equally energized, the base H is held at rest and feed of the tool I stops; and when the current in one field circuit exceeds that in the other, the base H is propelled in one direction or the other to feed the tool I in or out.

Propelled movement of the base H moves the rack 122 in one direction or the other, and the rack pinion 121 changes the angular position of the rotor 118 of selsyn motor 117.

The parts and circuits are arranged as to direction of movement, so that movement of the base H, resulting from displacement of the rotor 113 angularly with respect to the rotor 118, always moves the rotor 118 angularly toward the position at which the rotors are in corresponding or symmetrical positions.

It will be observed that the units 70—81 of transmission J are always rotating at high speed, and do not ever have to be started from rest and accelerated, nor reversed, when signaled to feed the tool I in or out by displacement of the rotor 113 and change of relative field strength; and that the units 70—81, therefore respond sensitively to changes of field strength; and that the device 90 supplies amplified field currents to the units 70—81 in response to small angular displacements of the rotor 113 caused by stylus movement in or out; and that therefore the feed movements of the base H "keep up" with the in and out movements of the stylus; and that the in and out feed movements of the base H which are the answer to the signals from the rotor 113, move the rotor 118 to terminate the signals when answered; and that the tool I is thereby maintained in fed positions corresponding at all times to the position of the stylus; and therefore the tool I produces at the work blank a work piece in correspondence with the pattern piece.

In order for the in and out feed of the tool I to be always in correspondence with the in and out movements of the stylus 101, it is obvious that the feed of the tool must at times be reversed.

It is also desirable to feed the tool by motor power; and since, particularly in the case of the preferred milling cutter type of tool, the feed must be slow, it is necessary to have speed reduction between the motor and the tool feed.

The best machine tool practice dictates speed reduction by a meshed gear type of transmission; but meshed gears unavoidably have back-lash lost motion.

If such a known transmission were utilized in the present instance, then when the power to the tool was reversed, the tool feed would stop momentarily until the back-lash lost motion was taken up by the reversal. But the work blank would continue to rotate; and the tool would continue to cut, and continue to be traversed without interruption, and the momentary stoppage of the tool feed would cause is cut to deviate from that prescribed by the pattern piece, and produce a deviation or mutilation of form on the surface of the work piece, which as mentioned hereinbefore would have to be corrected by time consuming costly hand tooling.

The transmission J hereof obviates this objection to prior transmission, notwithstanding that it utilizes meshed gears in the transmission as a whole and also speed reduction gears, for example, at the bevel gears 66—67 and 79—80; and could as is obvious have any desired amount of additional speed reduction by additional speed reduction gears. This is explained as follows.

It will be assumed that, as described above, the transmission parts K and L are both propelling the base H downwardly and feeding the tool I outwardly away from the work axis while cutting, and that the control signals for the feed to stop and reverse.

The feed will stop only when both units 70 and 81 have their fields equally energized and both are acting as generators, and the pinions 52 and 53 are exerting equal torques on the racks 54—55 in opposite directions.

During feeding downwardly as described the field of unit 70 is stronger than that of unit 81; the unit 70 is acting as a generator and the unit 81 is acting as a motor; and to reverse the feed, the field of unit 81 changes to be the stronger one and the unit 81 becomes the generator and the unit 71 the motor.

During the change of field strength, the fields become equal, and both units act as generators; and at such time the unit 70 of the transmission part K is already acting as a generator as in normal feeding operation and continues to exert downward propulsion torque on the pinion 52, and will continue to do so when the fields become equal; and thus the unit 70 continues to hold all of the back-lash at the gears 63, 64, 66, 67 and rack pinion 52, in taken-up condition, while the unit 81 is changing to a generator.

The unit 81 as it changes from a motor to a generator, reverses the torque on the rack pinion 53 and first introduces the back-lash of the gears 76, 77, 79 and 80 and rack pinion 53, then immediately as it becomes a generator takes it all up again.

Thus at the time that both fields have become equal and both units are generators, all of the back-lash in the part K of the transmission continues to be held in taken up condition and the torque on pinion 53 has reversed and all back-lash in the part L of the transmission has become taken up.

Then when the field of unit 81 becomes the stronger, the unit 70 changes from a generator to a motor and reverses the torque on rack pinion 52 and first introduces the back-lash of the part K of the transmission and then takes it all out again; but before this occurs, the unit 81 which had already become a generator continues to act as one and continues to keep the back lash taken up in the part L of the transmission.

Thus during slowing down of the feed in one direction, preparatory to stopping, the unit 70 keeps out back-lash between the driving motor and the base H, and does so until stopping occurs; and by the time stopping has occurred the unit 81 has taken out the back-lash between the motor and base H in the reverse feed direction; so that feed in the reverse direction is initiated without back-lash.

Thus there is always a feed driving transmission, without back lash between the motor and tool, through gearing, including speed reduction gears, during the whole sequence of slowing down, stopping and reversing the feed.

Referring again to the transmission B by which, as described, torque is applied to the shaft 6 through speed reduction gears 16 to 18 and 29 to 31 and 19 in the counterclockwise direction; and referring to Fig. 5; it will be seen that during a complete revolution of the bank A the applied torque, in general, holds the blank against the tool I with pressure, the tool opposing rotation of the blank, and opposing the driving torque of the shaft 6.

The lost motion in the aforesaid speed reduction gears is all taken up so long as torque is developed on the shaft 6 to overcome the opposition by the tool.

When the desired form of the work piece is oblong, as in the illustrated chosen example, and with reference to Fig. 5, it will be noted that there is a time in the revolution of the blank A when the tool (relatively speaking) passes over an edge of the work piece form. As the tool approaches the extremity of the edge, it is fed away from the shaft axis 10; and after it passes the extremity of the edge it is fed toward the axis; and while it is approaching the edge the tool is in position to oppose the shaft torque and is a shaft load; but as it reaches the edge its opposition to the shaft torque decreases, and as it passes the edge it begins to be fed in, and it no longer opposes rotation but assists rotation and propels the blank and shaft 6 and pattern piece C forwardly.

In the absence of automatic countervailing functions of the transmission B to be described, this forward rotary movement of the blank by the tool would be free and unopposed due to the back-lash lost motion in the aforesaid gears, and would be a momentary free forward movement through a rotational angle determined by the total back-lash of the gears.

Also, as the tool is fed into the work piece beyond the said edge, it reaches a point where it again will begin to oppose rotation of the blank. Thereupon the transmission will again develop driving torque on the shaft 6, but before it could do so the back-lash lost motion would all be taken out.

Thus as the tool passes over the edge of the work piece being formed, the blank would first be momentarily moved forward freely during a back-lash-time-period, while the back lash lost motion was being introduced, and subsequently the work piece would slow down or stop for a back-lash-time-period while the back lash lost motion was being taken up.

The tool being always traversed, axially along the work, the aforesaid irregularities of rotary movement of the blank caused by back-lash, would make mutilations of or deviations from the wanted form of the work piece.

By the aforementioned countervailing functions of the transmission B which will now be described, the said back-lash lost motion in the gears is prevented from causing said irregularities of blank movement.

If the fields of the units 20 and 33 were at any time equal, the units would both operate as generators running in opposite directions and they would be running at the same high speed, twice that of the spider elements 12 and 25.

In the transmission B as described, the field of unit 20 is stronger than that of unit 33 and the unit 20 acts as a generator, and its output potential overpowers the counter-potential of the unit 33 and it acts as a motor.

When as referred to, the tool passes over the said edge of the work piece form, there is a period of transition, from tool opposition of shaft rotation, to tool assisting of shaft rotation.

As described hereinbefore, the shaft 6 when under load, runs at a speed at which the selsyn rotor 140 connected to it, Fig. 1A, lags behind the selsyn rotor 135.

When the tool begins to assist rotation of the shaft 6, it will speed up, and drive the selsyn rotor 140 faster, until it is running at the same speed as the selsyn rotor 135 and then may even drive it faster than the rotor 135.

As described if both selsyn rotors 140 and 135 are running at the same speed, the current in the signal circuit 141 is at zero value, and the fields, 21 and 34, Fig. 1A are equal and both electrodynamic units 20—33 act as generators.

It was described in detail hereinbefore for the double differential transmission J of Fig. 1 that whenever the two units 70 and 81 thereof are both generators, all backlash lost motion in the two sets of reduction gears is in taken up condition; so that which ever unit thereafter becomes a motor and which a generator, there is always one of the sets of gears that are in driving meshed engagement through which transmission to the driven load takes place, so that the back-lash lost motion cannot interrupt the continuity of the drive or make it irregular.

The same description applies to the differential transmission B of Fig. 1A and its units 20 and 33 and its two sets of gears 16 to 18 and 29 to 31 and 19 (and need not be repeated here); it having been described above how the two units 20—33 both became generators.

Thus when the tool passes the edge of the work piece form and the tool feed is in the direction to propel the shaft 6 forwardly in the manner of an overhauling load, it does so but without momentary sudden or increase of shaft speed due to introducing back-lash lost motion; and when the work piece rotates to the position where the tool load again comes on the shaft 6, the shaft does not momentarily stop to allow the back-lash lost motion to be taken up again.

The bad effects of first introducing and then taking up back-lash lost motion have been emphasized hereinbefore.

The described embodiment may be adapted to the forming of a two-dimensional work piece, for example one cut from a sheet metal disc; by deenergizing the motor 48 to eliminate the traverse feed of the tool I.

I claim:

1. In an apparatus for forming a workpiece corresponding to a pattern piece of variable radius with respect to an axis, the combination of a rotatable support for the pattern and the workpiece, a drive transmission for imparting rotation to said rotatable supports in unison, a stylus engageable with the periphery of the pattern piece, a forming tool supported for movement toward and away from the axis of rotation of the supporting means for the workpiece, and drive means for moving the forming tool toward and away from the axis of rotation of the workpiece comprising a pair of electrodynamic units, means for impressing voltages on each of said electrodynamic units, a gear transmission in driving engagement with each of said units normally urging the forming tool in opposite directions, thereby maintaining the forming tool stationary, and means controlled by movements of the stylus for varying the voltages impressed on the electrodynamic units, thereby causing one of said units to become the driving unit and the other of said units to become the driven unit, whereby the movement is imparted to the forming tool toward or away from the axis of rotation of the workpiece, while backlash is overcome by the dragging effect of the other unit.

2. Apparatus as set forth in claim 1 wherein said gear transmissions in driving engagement with said electrodynamic units include differential gearing.

3. An apparatus as set forth in claim 1 wherein the means controlled by the movements of the styuls for varying the voltages impressed on the electro-dynamic units, causing one of the units to become the driving unit and the other of said units to become the driven unit, comprises an electrodynamic unit controlled by the movements of the stylus, an electrodynamic unit controlled by the movements of the forming tool, an electrical circuit, the flow of current in which is determined by the out of phase relationship between the electrodynamic unit controlled by movements of the stylus and the electrodynamic unit controlled by movements of the forming tool, and a voltage control device controlled by said electrical circuit for varying the voltages impressed on the electrodynamic units which control the torques delivered to the gear trains.

4. In an apparatus for forming a workpiece corresponding to a pattern piece of variable radius with respect to an axis, a rotatable support for the pattern, a rotatable support for the workpiece, drive means for rotating the supports for the pattern and the workpiece in unison, a stylus supported for movement toward and away from the axis of rotation of the pattern to permit the stylus to follow the contour of the pattern, a forming tool supported for movement toward and away from the axis of rotation of the workpiece, drive means for imparting movement to the forming tool toward or away from the axis of rotation of the workpiece, means for controlling the movements of the forming tool toward and away from the axis of rotation of the workpiece in accordance with the movements of the stylus, a drive transmission for transmitting rotation from the drive means to the supports for the pattern and the workpiece, said drive transmission comprising differential gearing and two sets of gear trains through both of which rotary power is normally transmitted, and means for imparting through said differential gearing a greater torque to one of said sets of gear trains than the other, so that the speed of rotation of the pattern and the workpiece will be determined by the difference in said torques, the drag of the one gear train eliminating backlash.

5. In an apparatus for forming a workpiece corresponding to a pattern piece of variable radius with respect to an axis, a rotatable support for the pattern, a rotatable support for the workpiece, drive means for rotating the supports for the pattern and the workpiece in unison, a stylus supported for movement toward and away from the axis of rotation of the pattern to permit the stylus to follow the contour of the pattern, a forming tool supported for movement toward and away from the axis of rotation of the workpiece, drive means for imparting movement to the forming tool toward or away from the axis of rotation of the workpiece, means for controlling the movements of the forming tool toward and away from the axis of rotation of the workpiece in accordance with the movements of the stylus, a drive transmission for transmitting rotation from the drive means to the supports for the pattern and the workpiece, said drive transmission comprising differential gearing and two sets of gear trains through both of which rotary power is normally transmitted, means for imparting through said differential gearing a greater torque to one of said sets of speed reduction gears than the other, so that the speed of rotation of the pattern and the workpiece will be determined by the difference in said torques, the drag of the one gear train eliminating backlash, and means to vary the torques tarnsmitted to the sets of gear trains in accordance with variation in the speed of rotation of the workpiece and the pattern to compensate for the tendency of the forming tool to advance or retard the speed of rotation of the workpiece and the pattern.

6. An apparatus as set forth in claim 5 wherein the means to vary the torques transmitted to the sets of gear trains comprises an electrodynamic unit coupled through said differential gearing to each of the gear trains, an electrical circuit connecting the rotors of said electrodynamic units in series, a voltage control device for varying the voltages impressed across the field windings of each of the electrodynamic units, and means controlled by acceleration or deceleration in the speed of rotation of the workpiece and pattern for regulating the voltage control device, whereby the voltage control device varies inversely the voltages impressed on the field windings of the electrodynamic units to increase or decrease the torques transmitted to each of the gear trains.

References Cited in the file of this patent

UNITED STATES PATENTS

| | | |
|---|---|---|
| 1,877,605 | Shivers | Sept. 13, 1932 |
| 1,998,939 | Mittag | Apr. 23, 1935 |
| 2,116,593 | Bouvier et al. | May 10, 1938 |
| 2,151,743 | Chladek | Mar. 28, 1939 |
| 2,616,337 | Tappert et al. | Nov. 4, 1952 |